(12) United States Patent
Kerins et al.

(10) Patent No.: US 10,312,969 B2
(45) Date of Patent: Jun. 4, 2019

(54) DATA TRANSMISSION AND CONTROL OVER POWER CONDUCTORS

(71) Applicants: Kevin Frances Kerins, The Woodlands, TX (US); Mark Charles Philip, Cypress, TX (US)

(72) Inventors: Kevin Frances Kerins, The Woodlands, TX (US); Mark Charles Philip, Cypress, TX (US)

(73) Assignee: Oceaneering International, Inc., Houston, TX (US)

( * ) Notice: Subject to any disclaimer, the term of this patent is extended or adjusted under 35 U.S.C. 154(b) by 379 days.

(21) Appl. No.: 14/591,231

(22) Filed: Jan. 7, 2015

(65) Prior Publication Data

US 2016/0004251 A1    Jan. 7, 2016

Related U.S. Application Data

(60) Provisional application No. 61/924,546, filed on Jan. 7, 2014.

(51) Int. Cl.
*G05D 1/00* (2006.01)
*H04B 3/54* (2006.01)
*H04B 3/60* (2006.01)

(52) U.S. Cl.
CPC ........... *H04B 3/546* (2013.01); *G05D 1/0022* (2013.01); *H04B 3/60* (2013.01)

(58) Field of Classification Search
CPC ......... H04B 3/546; H04B 3/60; G05D 1/0022
USPC ......................................................... 700/98
See application file for complete search history.

(56) References Cited

U.S. PATENT DOCUMENTS

| | | | | |
|---|---|---|---|---|
| 5,329,520 A * | 7/1994 | Richardson | ............... | H04J 3/14 340/2.21 |
| 5,706,278 A * | 1/1998 | Robillard | .......... | H04L 12/40156 370/222 |
| 6,167,831 B1 * | 1/2001 | Watt | ........................ | B63G 8/001 114/245 |
| 2002/0024594 A1 * | 2/2002 | Yamamuro | ............ | H04N 7/185 348/81 |
| 2004/0246753 A1 * | 12/2004 | Kunow | ................. | H02M 3/285 363/65 |

(Continued)

*Primary Examiner* — Ziaul Karim
(74) *Attorney, Agent, or Firm* — Maze IP Law, P.C.

(57) ABSTRACT

A system for controlling a subsea device comprises a complimentary set of data communication interfaces operatively coupled to an electronically interrogatable component of a subsea device and a remotely disposed device controller via a power conductor which defined data pathway between the subsea device and the remotely disposed device controller. A data transceiver is operatively coupled to the electronically interrogatable component and the remotely disposed device controller via the complimentary set of data communication interfaces over the power conductor. In configurations, control and/or telemetry or other data may be unidirectionally and/or bidirectionally transmitted between the electronically interrogatable component of a subsea device and a remotely disposed device controller. In configurations, data faults may be monitored in a primary data path and, if a fault detected, control and/or telemetry or other data transmission switched to the power conductor data pathway, manually and/or automatically.

18 Claims, 1 Drawing Sheet

(56) References Cited

U.S. PATENT DOCUMENTS

| | | | | |
|---|---|---|---|---|
| 2011/0177779 A1* | 7/2011 | Rhodes | ............... | H04B 11/00 |
| | | | | 455/40 |
| 2011/0198092 A1* | 8/2011 | Machin | ............... | E21B 17/012 |
| | | | | 166/349 |
| 2011/0247825 A1* | 10/2011 | Batho | ............... | E21B 41/0007 |
| | | | | 166/335 |
| 2012/0175125 A1* | 7/2012 | Krohn | ............... | E21B 33/0355 |
| | | | | 166/344 |
| 2013/0073679 A1* | 3/2013 | Fellman | ............... | H04L 12/6418 |
| | | | | 709/217 |

* cited by examiner

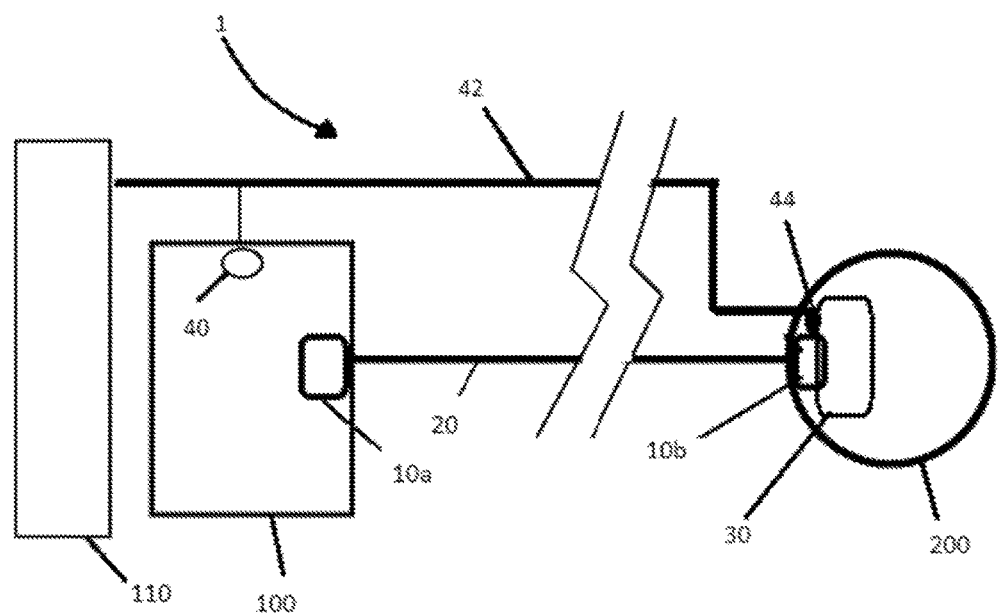

DATA TRANSMISSION AND CONTROL OVER POWER CONDUCTORS

RELATION TO OTHER APPLICATIONS

This application claims priority through U.S. Provisional Application 61/924,546 filed Jan. 7, 2014.

BACKGROUND

At times, having a data pathway between a subsea device such as a remotely operated vehicle (ROV) or other subsea device which minimizes data pathway runs is desirable. The data pathway can be used for control data, e.g. commands, and telemetry such as video telemetry. Although extra fibers or other pathways may be inexpensive and easy to use for such a data pathway, extra fibers may not always provide real redundancy. Moreover, many ROV and other subsea systems do not have fiber capability.

Further, at times a primary means of communication may fail, e.g. such as after suffering fiber failures in the umbilical and/or tether, and a readily available backup data transmission system is advantageous. Failures can include cyclical redundancy check (CRC) failures, total failures (e.g. fiber paths break or become otherwise unusable), or the like, or a combination thereof.

FIGURES

Various figures are included herein which illustrate aspects of embodiments of the disclosed inventions.

FIG. 1 is a block diagram of an exemplary embodiment of the invention.

DESCRIPTION OF EXEMPLARY EMBODIMENTS

This invention includes a means by which a remotely operated vehicle (ROV) or other subsea device may be controlled using control and video telemetry transmitted over the power conductors in an umbilical and/or tether attached to the ROV or device rather than using primary data pathways such as fiber optics. Such transmission can be used as a potential backup for current systems such as via ROV umbilicals should the primary communication system fail such as after suffering fiber failures in the umbilical and/or tether, as a backup system or even as a primary data transmission system. The invention uses umbilical or other power conductors coupled to interfaces such as power line modems to effect uni- and/or bi-directional data transmission.

Although this can be a primary data communications system, the control system can also be used to switch from fiber mode to power line transmission mode such as when a fiber failure is detected, either automatically or manually or both. Alternatively, control can be manually switched between a primary system such as a fiber optics based system to using umbilical power conductors a data transmission system. If a subsea system such as an ROV has a plurality of power lines, a plurality of power line modems may be employed to provide redundancy or additional redundancy. The ability to use power lines for communications may also be used to supply a redundant, backup, and/or primary data system for other products such as a subsea field pumping system and others that rely on power conductors and fibers for power and control.

Accordingly, existing power conductors according to the invention allow for transmission of control and/or telemetry data without requiring extra fibers. Although the technology may not provide the bandwidth that fiber data transmission can bring, it can provide sufficient bandwidth, either baseband or broadband, for control and video. Thus, both or either of these uses (data or video) may be of a lower bandwidth than primary systems such as fiber based modes, but still sufficient to effect the necessary telemetry and control.

Referring now to FIG. 1, system for controlling a subsea device 1 comprises a complimentary set of data communication interfaces 10a and 10b, operatively coupled to and providing pathways between one or more power and/or electronically interrogatable components 110 of subsea device 100 and remotely disposed device controller 200; power conductor 20, operatively coupled to subsea device 100 and remotely disposed device controller 200 via the complimentary set of data communication interfaces 10a, 10b, where power conductor 20 defines a power conductor data pathway between the complimentary set of data communication interfaces 10a,10b; and data transceiver 30 operatively coupled to subsea device 100 and remotely disposed device controller 200 via the complimentary set of data communication interfaces 10a and 10b over power conductor 20.

System 1 may further comprise one or more data transmission failure sensors 40 configured to detect a data transmission failure in one or more associated primary data communications pathways 42. Data transmission switch 44 may be present and operatively in communication with one or more data transmission failure sensors 40 and data transceiver 30, where data transmission switch 44 is configured to detect a data transmission failure one or more of the primary data communications pathways 42 and, upon such a detection, cause data transceiver 30 to transmit data over a power conductor data pathway defined by one or more predetermined power conductors 20.

Power conductor 20 is typically configured to provide power as well as data to subsea device 100 and, in embodiments, may comprise one or more power conductors disposed in an umbilical or tether attached to subsea device 200.

In embodiments, power conductor 20 comprises a plurality of power conductors 20 and a set complimentary set of data communication interfaces 10a,10b associated with a predetermined subset of the plurality of power conductors 20, e.g. one set of data communication interfaces 10a,10b per each power conductor 20. Each power conductor 20 of the predetermined subset of the plurality of power conductors 20 is typically operatively coupled to subsea device 100 and remotely disposed device controller 200 via its associated complimentary set of data communication interfaces 10a,10b. As will be familiar to those or ordinary skill in data communications pathways arts, data communication interfaces 10a,10b may use one or more separate wires in one or more power conductors 20 to effect data communications.

Data transmitted along power conductors 20 typically comprise control and video telemetry data. In most embodiments, data transceiver 30 and one or more complimentary sets of data communication interfaces 10a,10b are configured to provide sufficient data bandwidth for control and video data in a baseband data transmission mode, a broadband data transmission mode, or a combination thereof. Data transceiver 30 and one or more of its complimentary set of data communication interfaces 10a,10b may also be configured to provide uni-directional and/or bi-directional using a predetermined data transmission protocol such as, by way of example and not limitation, Power Line Communications (PLC), Broadband over Power Lines (BPL), or the like, or a combination thereof.

Subsea device 100 may include a remotely operated vehicle, a subsea field pumping system, or the like, or a combination thereof.

In the operation of exemplary embodiments, commands and data appropriate to monitor and/or control subsea device 200 may be implemented by establishing a data communication path between subsea device 100 and remotely disposed device controller 200 over one or more power conductors 20 coupled to a respective set of a complimentary set of data communication interfaces 10a,10b, where one or more of such power conductors 20 is configured to provide power to subsea device 200 as well as data. Although a data communication pathway defined by power conductor 20 may be a primary means of data communication between device controller 200 and subsea device 100, one or more power conductors 20 may also provide data communication pathways along which data may be transmitted, in some cases along with power, via the complimentary set of data communication interfaces 10a,10b where the data communication pathway defines a redundant data communications pathway to subsea device 100 along with primary data communications pathway 42.

In certain embodiments, a data communication failure may be detected, e.g. primary data transmission pathway 42, and, upon such detection, data transmission switched from the failing data pathway 42 to data transmission over a data communication path defined by power conductor 20. The switching may be automatic or, in certain embodiments, manual.

The foregoing disclosure and description of the inventions are illustrative and explanatory. Various changes in the size, shape, and materials, as well as in the details of the illustrative construction and/or an illustrative method may be made without departing from the spirit of the invention.

We claim:

1. A method of controlling a subsea device, comprising:
   a. establishing a data communication path between an electronically interrogatable component of a subsea device and a separate, remotely disposed device controller that is not part of the subsea device over a power conductor cable operatively coupled to a complimentary set of data communication interfaces, one data communication interface of the set of data communication interfaces operatively in communication with the electronically interrogatable component and the other data communication interface of the set of data communication interfaces operatively in communication with the remotely disposed device controller;
   b. providing power to the subsea device over the power conductor cable;
   c. using the power conductor cable to provide power to the subsea device; and
   d. detecting a primary data transmission pathway data communication failure; and
   e. after detecting the primary data transmission pathway data communication failure, switching to the data communication path to transmit data between the electronically interrogatable component and the remotely disposed device controller over the power conductor cable via a data transceiver operatively coupled to the subsea device and the electronically interrogatable component via the complimentary set of data communication interfaces.

2. The method of claim 1, wherein the subsea device comprises a remotely operated vehicle.

3. The method of claim 1, wherein the subsea device comprises a subsea field pumping system.

4. The method of claim 1, wherein the existing power conductor cable comprises a power conductor disposed in an umbilical or tether attached to the subsea device.

5. The method of claim 1, wherein the data comprise control data and video telemetry data.

6. The method of claim 1, wherein the complimentary set of data communication interfaces comprise a complimentary set of power line modems.

7. The method of claim 1, wherein the data communication interfaces are configured to effect unidirectional data transmission.

8. The method of claim 1, wherein the data communication interfaces are configured to effect bi-directional data transmission.

9. The method of claim 1, wherein the data communication path comprises a primary data communication pathway between the remotely disposed device controller and the electronically interrogatable component.

10. The method of claim 1, wherein the data communication path defines a redundant data communications path between the remotely disposed device controller and the electronically interrogatable component, the method further comprising
    b. automatically switching data transmission from the primary data transmission pathway to data transmission over the power conductor data communication path when the primary data transmission pathway data communication failure is detected.

11. The method of claim 1, wherein the data communication path defines a redundant data communications path between the remotely disposed device controller and the electronically interrogatable component, the method further comprising:
    b. manually switching data transmission from the primary data transmission pathway to data transmission over the power conductor data communication path.

12. A system for controlling a subsea device, comprising:
    a. a complimentary set of data communication interfaces operatively coupled to an electronically interrogatable component of a subsea device and to a separate, remotely disposed device controller that is not part of the subsea device;
    b. a power conductor cable operatively coupled to the subsea device and the remotely disposed device controller to provide power to the subsea device, the power conductor cable further defining a power conductor data pathway between the complimentary set of data communication interfaces via the complimentary set of data communication interfaces;
    c. a data transceiver operatively coupled to the electronically interrogatable component and the remotely disposed device controller via the complimentary set of data communication interfaces over the power conductor cable;
    d. a data transmission failure sensor configured to detect a data transmission failure in a primary data communications pathway; and
    e. a data path switch operatively in communication with the data transmission failure sensor, the primary data communications pathway, and the data transceiver.

13. The system for controlling a subsea device of claim 12, wherein the power conductor cable is configured to provide power to the subsea device.

14. The system for controlling a subsea device of claim 12, wherein the power conductor cable comprises:
   a. a plurality of power conductor cables; and
   b. a set of complimentary data communication interfaces associated with a predetermined subset of the plurality of power conductor cables, each power conductor cable of the predetermined subset of the plurality of power conductor cables being operatively coupled to an electronically interrogatable component of the subsea device and the remotely disposed device controller via its associated complimentary set of data communication interfaces.

15. The system for controlling a subsea device of claim 12, wherein the data transceiver and the complimentary set of data communication interfaces are configured to provide sufficient bandwidth for control data and video data over the power conductor data pathway.

16. The system for controlling a subsea device of claim 12, wherein the data transceiver and the complimentary set of data communication interfaces are configured to provide either baseband or broadband data transmissions over the power conductor data pathway.

17. The system for controlling a subsea device of claim 12, wherein the data transceiver and complimentary set of data communication interfaces are configured to provide unidirectional or bidirectional data communications over the power conductor data pathway using a predetermined data transmission protocol.

18. The system for controlling a subsea device of claim 17, wherein the data transmission protocol comprises Power Line Communications (PLC) or Broadband over Power Lines (BPL).

* * * * *